United States Patent [19]

Switsen

[11] Patent Number: 4,467,358

[45] Date of Patent: Aug. 21, 1984

[54] VIDEO TAPE RECORDER SIGNAL PROCESSOR

[76] Inventor: Henry N. Switsen, 17236 Bircher St., Granada Hills, Calif. 91344

[21] Appl. No.: 347,339

[22] Filed: Feb. 9, 1982

[51] Int. Cl.³ .............................................. H04N 5/76
[52] U.S. Cl. ...................................... 358/153; 358/319
[58] Field of Search ............... 358/153, 154, 155, 156, 358/157, 319

[56] References Cited

U.S. PATENT DOCUMENTS

| | | | |
|---|---|---|---|
| 3,018,324 | 1/1962 | Leyton | 358/319 |
| 3,059,052 | 10/1962 | Smith | 358/319 |
| 4,121,242 | 10/1978 | Janko | 358/319 |
| 4,286,281 | 8/1981 | Suzuki | 358/319 |

*Primary Examiner*—Michael A. Masinick

[57] ABSTRACT

A circuit for reinserting full vertical sync pulse width back into a composite video signal which has been especially modified to contain a narrower, or weaker, vertical sync pulse so as to make video tape recording of this modified video signal difficult or impossible. This reinsertion process is carried out WITHOUT neccessitating the interruption, breaking or cutting of the base band video cable or line carrying the modified video signal, and thus eliminates the need for carefully designed non distorting wide band video amplifiers, and the power to run these amplifiers, the space used in the reinserter by these amplifiers, and the cost to manufacture these amplifiers.

18 Claims, 21 Drawing Figures

VIDEO TAPE RECORDER SIGNAL PROCESSOR

Further the carefully arranged circuitry of the vertical sync processor design disclosed here allows for a minimum of components and D.C. power required to perform the timing function of the pulses required to perform the sync correction process therefore allowing a significantly lower manufacturing cost and practical battery powered operation, eliminating the need for a household power supply, and increasing safety as a result.

Also described is a very simple means to insert weakened vertical sync into "NORMAL" composite video signals. The same circuit will perform either task, the circuit function is determined simply by changing the bias on a capacitor.

Also described is a very inexpensive way to add both audio and video high frequency response correction to the base band cable lines carrying these signals to, or from the vertical sync processing circuitry of the invention.

Also described is a very inexpensive way to vertical sync correct base band video signals to be modulated up to radio frequequencies in the television spectrum by ELIMINATING THE R.F. MODULATOR ITSELF.

BACKGROUND OF THE INVENTION

Video tape producers of pre-recorded tapes aimed at sale or rental to the consuming public are concerned that their tapes will be duplicated by these consumers. In their attempt to safeguard against unauthorized duplicating, many producers reduce the vertical sync pulse width of the composite video signal recorded on the tape.

Since video tape recorders designed for the home consumers use these vertical pulses for reference locking during recording, this process, (providing the vertical sync is weakened sufficiently) renders the copying of such tapes either difficult or impossible.

Unfortunately it also follows that these weaker vertical sync pulses, also adversely affect the television on which these tapes are viewed, by making the viewed picture "roll, jitter" and become generally unstable.

On many older televisions, a "vertical hold" control exists which the consumer can adjust to a setting which will allow locking on weaker vertical sync signals. Many consumers however, cannot make this adjustment because they cannot find the vertical hold control location on their television set (it is often hidden inside panels etc.) or often is accessed by a plastic shaft protruding from a potentionmeter on the back of the television set and they simply cannot find it, or the plastic is missing.

It is also not uncommon for the television receiver to be in such a state so that the vertical sync processing circuitry is already weak, but plays standard pictures satisfactorily, but cannot handle the weak signals at any setting of the vertical hold control.

Further on the majority of late model televisions, there is NO vertical hold control at all, and the consumer is totally disappointed by being unable to watch their pre-recorded tape selection at all, and must return their purchase or rental to the retail shop for a refund, causing disappointed and dissatisfied consumers and unhappy businessmen loosing revenue.

Obviously a device which can reinsert the full vertical sync strength to the composite video signal would be of benefit to both consumer and businessmen alike. Further since the tape producers do want this weakened vertical signal on their tapes, a low cost device to WEAKEN the vertical sync would be of benefit to tape producers as well.

Further, since the present invention describes a new and novel way of reinserting full strength vertical sync into base band video cables, a very economical means can now be disclosed to "high frequency correct" the video signal passing from the base band video input connection of the invention, to the video output connection of the invention, all without the use of "active" devices, by using only "passive" circuit elements such as only resistors and capacitors and inductors.

Economical means to "high frequency correct" both the base band video and the unmodulated audio signals playing back from pre-recorded video tapes for the consumer market would be of great benefit to these consumers. Field testing of many pre-recorded video tapes for sale or rent shows that the audio signal invariably contains too much amplitude (volume), and too much "base" component; the circuitry disclosed here will very simply correct both defects of the audio, and also disclosed is a very simple means to correct for two of the most frequent base band video difficiencies; lack of definition or "detail", and excessive "noise", or signal to noise ratio, (high frequency components contain the noise).

Further if only one home video tape recorder and a consumer type home television is employed, an R.F. modulator to convert base band video to R.F. frequency was previously required, as well as was an audio modulator for the sound portion of the desired program. These R.F. modulators alone cost more to manufacture or buy than does the entire reinserter described in the present invention.

DESCRIPTION OF THE PRIOR ART

A typical vertical sync reinsertion device in present usage might use circuitry similar to that shown in FIG. 2. A video input process amplifier A feeds a series or combination of circuit functions which in a typical case might be a sync separater B and a video sub process amplifier C. Along these same lines the sync separater B feeds a process and timing circuit D often containing circuitry the user must adjust while in use, to generate correction voltages fed back to sub process amplifier C to correct the composite sync signal. Then the corrected composite video signal is fed from sub process amplifier C to output amplifier E.

Although many variations on the routing of the circuit functions are possible, they all have one thing in common, and that is a manditory break in the physical connection of the wire between the video input and video output of the reinserter, and video amplifiers to send the video signals from input to output.

This now requieres carefully designed wide band, low distortion amplifiers to process these signals without excess amplification, or signal loss, or phase changes over a wider frequency range. If poor amplifiers are used, then the video output quality suffers to the degree of design deficiency. Further, no matter how well designed is the video amplifier, it CANNOT have as good a distortion and noise figure as does no amplifier at all, wherein lies one of the important features of the present invention.

Also, in the past with systems where only ONE home consumer type video machine was available for playing the pre-recorded tape into the television receiver, the method used was to process the base band video signal as described for FIG. 2, and then feed the processed video signals, along with the audio signals to a radio frequency modulator, (R.F. modulator) to convert these signals up to the television spectrum. These R.F. modulators, along with their interface and power supplies added substantially to the cost of the reinserter device, as the R.F. modulators of the kind needed for the job, (requiring government approval also) often cost more than the video processor portion of the devices themselves.

The present invention eliminates the need for these R.F. modulators altogether.

SUMMARY OF THE INVENTION

In accordance with one embodiment of the present invention, a simple circuit arrangement is provided to maximize efficiency by combining single stages to perform multiple functions using a minimum parts count and a minimum of D.C. power, to eliminate the need for any video amplifiers, and to provide a simple means to control the changing of the vertical sync, (weakening or strengthening).

In accordance with another embodiment of the present invention, very economical "high frequency correction" circuitry for base band video, or audio signals of both is added to the invention, without upsetting the circuit operation of the vertical sync reinserting circuitry in use.

In accordance with another embodiment of the present invention an audio-video R.F. modulator previously required has been eliminated.

In accordance with this embodiment of the present invention the circuit is further rearranged to make unneccessary a second home video machine, or "video" jack on a "monitor" type receiver.

As shown in FIG. 1A a variation of the invention is shown where the process and timing section feeds an R.F. line operating in the radio frequency television spectrum. In this embodiment, an even bigger savings in circuit manufacturing cost is realized because the "interface" of base band video to video R.F. modulator is eliminated, the 4.5 megacycle audio modulating circuitry is unneccessary, and indeed, even the R.F. modulator itself is gone, while still having a composite R.F. carrier with reinserted sync of full strength.

DESCRIPTION OF THE PREFERRED EMBODIMENT

Figure 1:
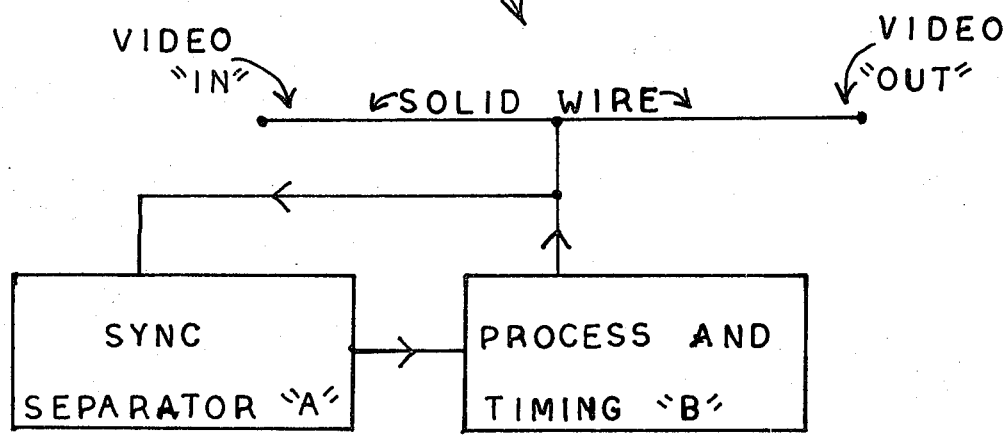
FIG. 1 is a block diagram of a circuit constructed in accordance with one embodiment of the invention.
Figure 1A:
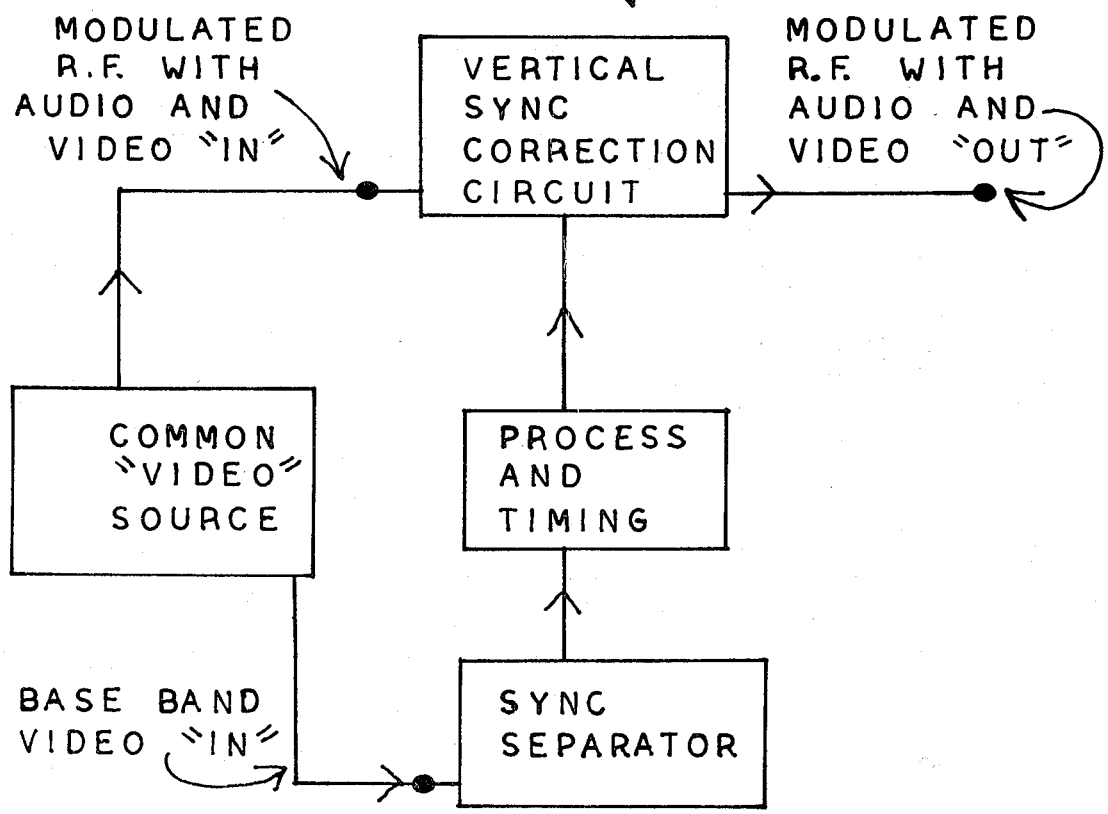
FIG. 1A is a block diagram of a circuit constructed in accordance with another embodiment of the invention.
Figure 2:
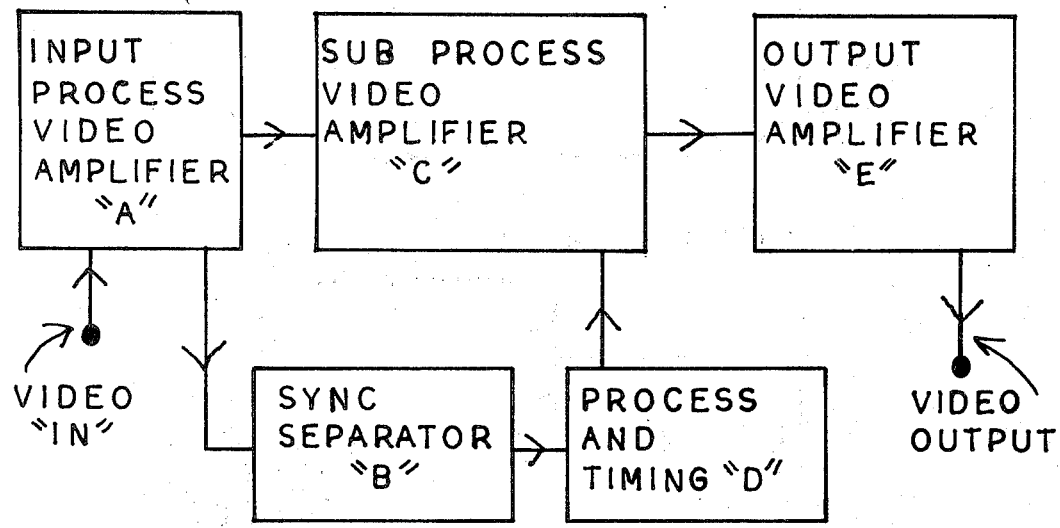
FIG. 2 is a block diagram of a typical prior art design.

FIG. 1 shows a block diagram of one embodiment of the present invention. The video input line, (also the video output line), feeds sync seperater "A" directly and sync separater A controls the process and timing circuitry "B", and the process and timing circuitry correct the unbroken video in-out line.

Figure 3:
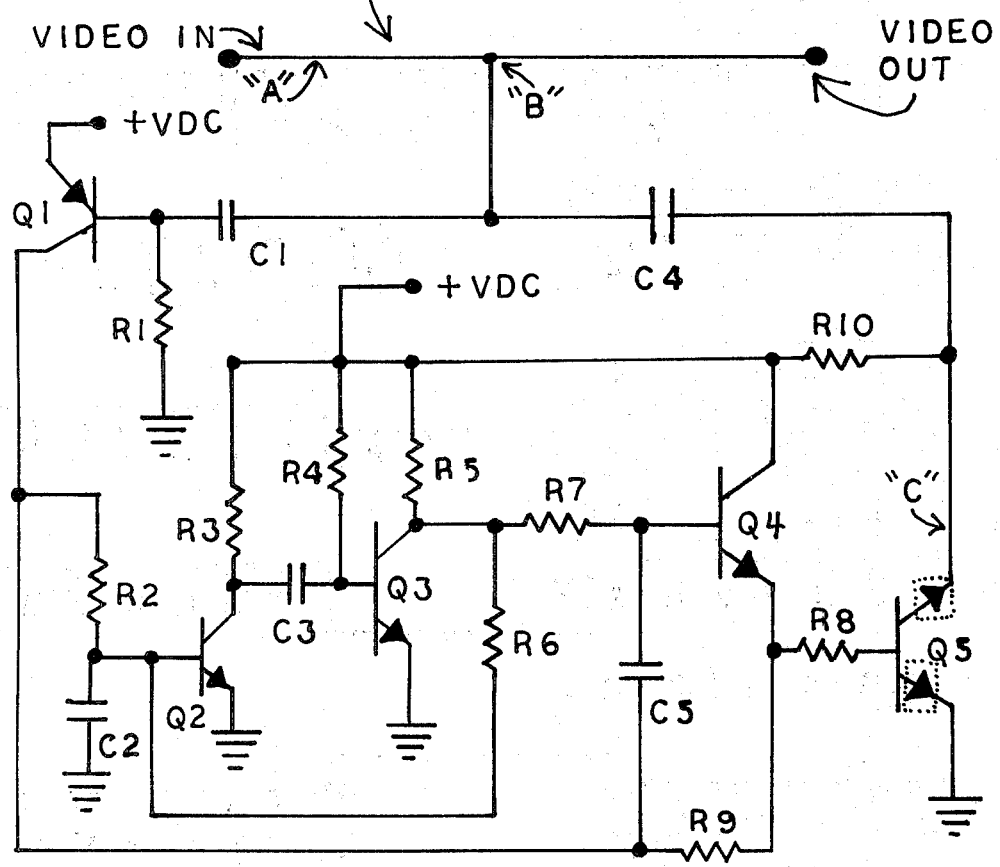
FIG. 3 is a schematic diagram of a circuit constructed in accordance with another embodiment of the present invention.

FIG. 3 illustrates a circuit constructed in accordance with the invention. Point A is the video input point with composite video signal containing a weakened vertical sync pulse. Since the industry standard for home video tape recorders is for negative going sync tips, a PNP transistor is selected for the sync seperater stage so it can be driven directly from the incoming composite signal without any processing circuitry to feed it. C1 couples the composite video signal to the base of Q1, and R1 biases Q1 to class C amplifier operation to cause the collector of Q1 to contain only composite sync. This is well known sync separater circuitry with R2 acting as the collector load resistor for Q1. The positive pulse tip amplitude at the Q1 collector is essentially equal to +VDC. The collector load resistor R2 does not return to ground as usual however. It instead is coupled directly to the base of Q2 an NPN transistor who's emitter is grounded. It is thus apparent that Q2 can turn "on" when it's base voltage reaches approximately 0.6 V. This would occur at the horizontal rate of 15750 C.P.S., since a positive pulse of that frequency appears at the collector of Q1. Q2 is prevented from turning on at the horizontal rate however by C2, which by virtue of the R.C. time constant R2-C2, prevents the voltage at the base of Q2 from reaching 0.6 volts in only 5 microseconds. (The pulse duration of standard horizontal sync). The time constant of R2 and C2 is chosen to be in excess of 5 microseconds by an amount deemed needed to respond only to the longer duration vertical sync pulses, but not so little in excess of 5 microseconds, (such as 6 microseconds), that unwanted noise pulses occuring at or near the horizontal sync time can cause Q2 to become active.

Testing of video tapes in poor condition (containing many dropouts) and signals mixed with static along the composite video signal show that values of 10 microseconds or longer for the time constant of R2-C2 give excellent noise immunity. The R2-C2 time constant must not be too long however or Q2 will not respond to weakened vertical sync. Time values of 10 to 15 microseconds for Q2 response will yield excellent results.

The collector of Q2 is kept substantially at a value equal to +VDC by R3 while Q2 is "off". The collector of Q2 is coupled to the base of Q3 by C3. The emitter of Q3 is grounded, and R4 biases the base of Q3 to be "on" for static conditions. R5 connects the collector of Q3 to positive VDC, but since Q3 is "on" there is very little collector voltage at Q3 during static conditions. Further, resistor R6 couples the collector of Q3 back to the base of Q2, and performs the additional function to supply a D.C. return path for the sync separator stage Q1 collector, and modify the waveform at the base of Q2 for better noise immunity simultaniously. Note here that Q2 and Q3 together also form a monostable multivibrator or "one shot" as its called. Resistor R7 couples the collector of Q3 to the base of Q4, which can be an output stage, but for reasons which will be explained below, is used as an emitter follower stage. The collector of Q4 is returned to positive VDC and R8 connects the emitter of Q4 to the base of Q5, the output transistor.

You will note that the emitter "arrow" of Q5 has been drawn in outline only for both other legs of Q5, for reasons which will also be explained below.

One of the remaining two leads of Q5 (other than the base), is returned to ground, and the other is coupled through C4 back to the video output lines, (also the video input line), at point B. Additionally R9 connecting the collector of Q1 to the emitter of Q4, and C5 connecting the collector of Q1 to the base of Q4 is shown, and R10 connecting the junction of C4 and Q5 to positive +VDC is shown. Their function will also be described below. Finally, the use of R7 is optional and its function will also be discussed below.

The static conditions of the circuit have been described and now the operation of vertical sync reinsertion will be discussed.

Figure 5:
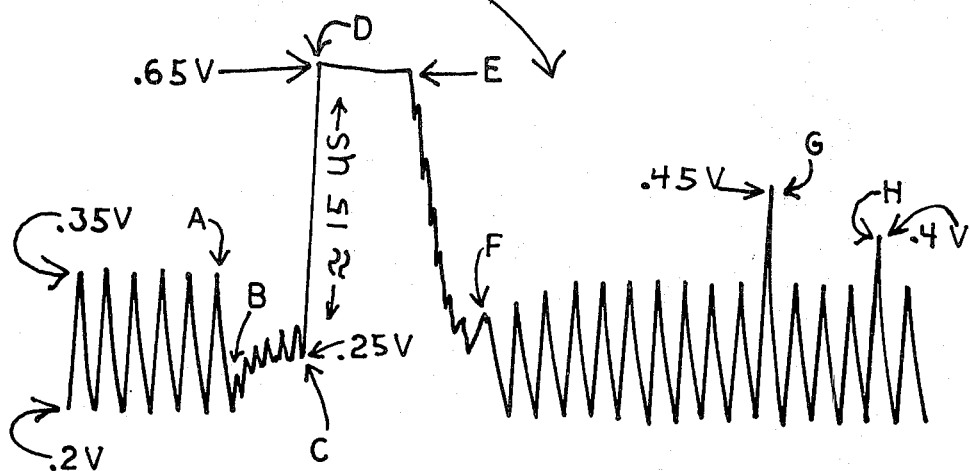
FIG. 5 shows the waveform at the base of Q2 of FIG. 3 for one field of video (½ frame).
Figure 5A:
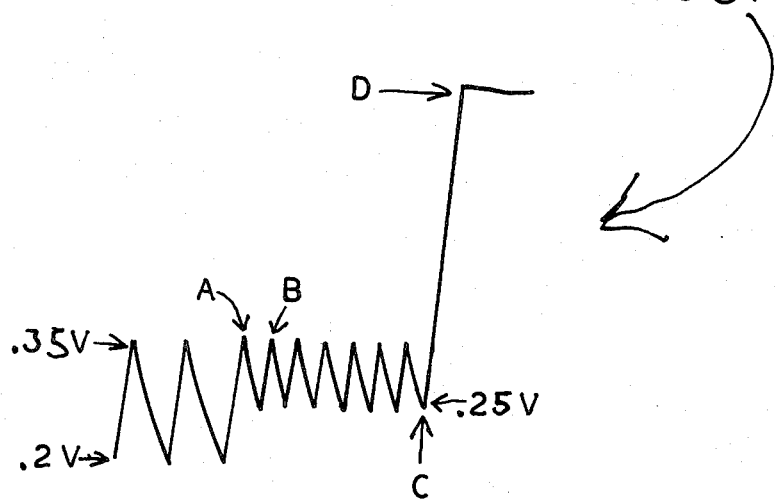
FIG. 5A shows the waveform at the base of Q2 of FIG. 3 for the alternate field of video (second ½ frame).

The base waveforms of Q2 are shown in FIG. 5 and 5A (one drawing for the "odd fields", and one for the "even fields"). This waveform is the result of drive voltage from the collector of Q1 and the circuit action of R2, C2 and R6.

With reference to FIG. 5 several of the last horizontal sync pulses are shown near the end of a field, and point A represents the last horizontal sync pulse for a full scanning line, and point B represents the first equalizing pulse. Point C represents the starting point of the vertical sync pulse. Note that point C in both FIGS. 5 and 5A are at the same level (0.25 volt) thus maintaining good interlace of the odd and even fields.

With reference to FIG. 5, the point D is the "turn on" point of Q2 in FIG. 3, and here, the collector of Q2 begins to fall from its static level at positive VDC. This fall in voltage is coupled to the base of Q3 by C3 and causes Q3 to "turn off", allowing the collector of Q3 to rise, feeding back a now positive voltage to the base of Q2 through R6, causing Q2 to saturate. The collector of Q2 now drops by a value equal to positive VDC as it saturates. This voltage drop is now coupled back to the base of Q3 by C3 and causes the base of Q3 to go negative by an amount equal to positive VDC, and the collector of Q3 reaches its temporary high state value determined by the voltage division of R5, R6, and load of Q4. This state of Q2 and Q3 remains, until the negative voltage on the base of Q3 is overcome by the action of R4, and Q3 again turns "on".

During the time that the collector of Q3 is in its high state, (Q3 "off"), current is supplied to the base of Q4 and hence to the base of Q5, causing a very low resistance to appear between the emitter and collector leads of Q5. While Q5 is on, the output lead C of Q5 is clamped to a very low impedance, low voltage value, and because of the coupling of this low impedance to the video output line via C4, the video peak to peak voltage on the video in-out line is literally "smashed" flat (as shown in FIG. 4B between point A and point B)

Figure 4:
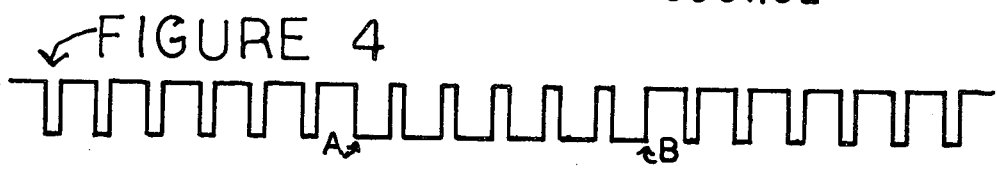
FIG. 4 shows a normal vertical sync waveform preceded by six equalizing pulses, and followed by 6 equalizing pulses.
Figure 4A:
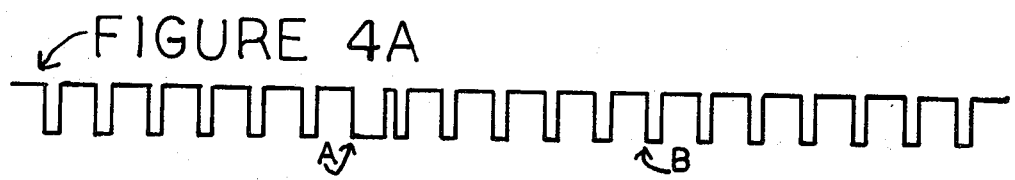
FIG. 4A shows a typical weakened vertical sync pulse preceded by 6 equalizing pulses and followed by 6 equalizing pulses.
Figure 4B:
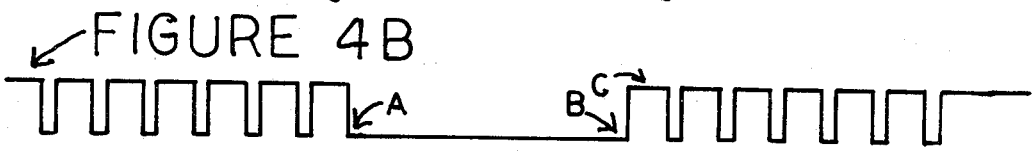
FIG. 4B shows a waveform of a reinserted vertical sync pulse.

As long as Q5 is "on", the composite video in-out signal cannot "leave" the sync tip level (blacker than black) (FIG. 4B point A to point B), and return to the black level, (FIG. 4B point C). This is shown in FIG. 4B between point A and point B, as reinserted vertical sync.

Since the video in-out line has been "crushed" flat, and is held at the sync tip level, the waveform of FIG. 5 is both high and flat between points D and E. After a time period determined by R4-C3, Q3 turns back "on", its collector voltage drops, Q5 turns "off", and Q2 turns "off", the video in-out line is released, and the circuit returns once again to its static state, awaiting the arrival of the next vertical sync pulse, to start the cycle again.

This is shown in FIG. 5 at point E, and the wave shape falls below 0.6 V, releasing Q2. After the 6 equalizing pulses, the first horizontal full scan line sync pulses return starting at point F and continuing on for another full field until the cycle starts again.

Also shown in FIG. 5 is a very severe noise pulse caused by a defect in the playback tape, shown at point G, and less severe noise pulse shown at point H. Both are well below the turn on level of Q2, and hence are ignored by the circuitry.

It will now be explained why Q5 is shown with its collector grounded, and also with its emitter grounded.

During the time Q5 is "on" the video in-out line is held very tightly at a pre-determined level. This level depends on the D.C. charge of C4 BEFORE Q5 is activated. Assuming for the moment that Q5 had no offset voltage when "on", then the output lead of Q5 would be "grounded" during the "on" time. With low impedance in C4 (which it has) the video in-out line would be held tightly at a D.C. level dependent on the voltage charge stored previously in C4. Since the video in-out line is usually at D.C. Zero, (although it need not be), a positive charge on C4 would send the video in out line suddenly negative by the amount of the charge on C4, and hold it there very tightly. If the level that the video in-out line is held at, happened to coincide with the sync tip level just prior to the turn-on of Q5, than the composite signal before, during, and after turn-on of Q5 will look like the drawing of FIG. 4B, which is however, most desirable. If the charge on C4 was lower, then the composite video signal would look like FIG. 4C. Also if the charge on C4 were larger in value, then the composite video signal would look like FIG. 4D.

It is thus seen that a very simple way of controlling the final shape of the composite video out signal is possible. Simply control the charge on C4.

Returning now to a real and practical Q5, there is an actual offset voltage associated with the transistor type used for Q5. This offset voltage can vary from approximately 2 millivolts to 0.5 volts depending on transistor type. Also, some transistors, depending on type chosen exhibit significantly lower offset voltages when "inverted", that is when their emitter and collector leads are reversed. Further, when in the "inverted" condition, the transistor exhibits a lower "beta" than when used normally. The above characteristics can be used to advantage by proper transistor choice and circuit arrangement as discussed below.

If Q5 were to be activated during horizontal sync time, for 5 micro seconds or less and this was repeated 15,750 times per second, then C4 would automatically acquire a charge on it during the field scanning time (non vertical sync time) which would be exactly the charge needed to precisely line up all the sync tips, horizontal and reinserted vertical, so as to match the drawing of FIG. 4B exactly.

As designed in FIG. 3, the reinsertion circuit already has 5 micro second pulses available at the collector of Q1, and the function of R9 and C5 is to couple them to the output stage.

It must be noted now the polarity of the signals involved in the total system. Negative going sync pulses appear at the video in-out line. These negative going sync tips generate positive going separated composite sync pulses at the collector of Q1. These positive pulses are then coupled through R9, C5 and R8 to output stage Q5 and a negative pull down effect is generated back to the video out line. Since a negative going sync tip starts a negative pull down at Q5 output, a "latch" condition can arise where a 5 micro second sync pulse starts a series ending in an even stronger pull down of the video in-out line and the video output will stop permanently.

When Q3 controls Q5 however, no such latch can occur because Q3 is controlled by an A.C. coupled system. (C3-R4), also C5 represents A.C. coupling. But when R9 enters the picture, a D.C. control is in effect and "latch up" can occur. By proper choice of the type of Q5, and the value of R9, as well as the circuit configuration used for Q5, (emitter or collector grounded) the total loop gain can be easily controlled to a low enough value so as to prevent the possibility of "latch up". It must however be considered in the choice of parts for R9 and Q5 as well as the configuration of Q5. A.C. coupling alone can be employed for these 5 micro second (or shorter) pulses; simply omit R9.

Since Q4 is used, the A.C. coupling from Q1 collector (C5) can be inserted into the base of Q4. This then is the reason that R7 is shown. Since Q3 is "on" during non vertical sync time, the collector of Q3 is low impedance during this time. This would stop these pulses from activating Q4 and hence stop Q5, so some impedance is added to the circuit to create an injection point for C5 to couple the collector of Q1 to the base of Q4. Also a combination of resistance such as R9 and a small capacitor in series with it would prevent "latch-up" by supplying A.C. coupling instead of D.C. coupling.

One purpose for using D.C. coupling at all, is as follows: with no composite video-in signal, and only A.C. drive to Q5, the positive "pull" of R10 over a long time period can cause appreciable charge to develop on C4. When the video line first becomes active and Q5 is suddenly driven very hard at the sensing of the first vertical sync pulse, a very large negative pulse can appear on the video in-out line. In "standby" mode, (no video input signal), the collector of Q1 also develops a positive charge. By coupling a high impedance D.C. means (R9) to partially drive Q5 during "standby", no appreciable charge is developed on C4 during "standby".

This large negative pulse can create some undesirable effects, such as momentarily upsetting the video machine circuitry when the circuit first becomes active, and can even momentarily upset the sync separator stage of the invention. Also note that a resistive divider instead of R10 alone could be used to bias C4, and thus would prevent "large" biases to appear on C4 during "standby". Mention is made of this here, because this resistive divider instead of R10 alone can eliminate the need for using R9, and then a larger number of transistor types can become usable for Q5, possibly allowing for greater volume buying of parts at a lower cost of manufacture.

The main purpose of using Q4 is too allow R5 to be a higher impedance value, and thus cut down on overall D.C. power drawn from positive VDC. Since Q3 is "on" for the majority of the time, and off for only the vertical sync time, the current drain of the entire circuit is principally used by R5. R1 can be on the order of 1 megohm, R2 conducts only during sync "tip" time; R3 conducts only during vertical sync tip time; R4 conducts constantly, but can be larger in value (smaller in current) than R5 by nearly the value of the beta of Q3, R8 can draw appreciable current, depending on circuit configuration it may be on the order of 100 ohms but again, it conducts only for vertical sync time and is thus of short duration. The addition of Q4 then, can cut the total average current drawn from +VDC by nearly the value of the beta of Q4, and this can become important in battery operated equipment. R10 can be used to provide an offsetting positive "pull" to offset any possible leakage in C4, and cancel some "pull down" effect which can be caused by non standard vertical sync waveforms at the video input, but is typically high impedance and does not add significantly to overall circuit power drain.

The above description should provide an understanding of the operation of FIG. 3. The general requirement for the overall circuit operation is simply this . . . firstly during horizontal sync time, a means is provided to engage the output stage to become active. The activity of the output stage need not be extreme during this time, but need only be active enough to set a predetermined charge (or bias level) on capacitor C4. Secondly a means is required to engage the output stage during vertical sync time. The activity of the output stage now must be extreme, and indeed must literally "crush" the video line to this predetermined level.

It is also important to note here that a simpler way to induce a charge (or bias) on C4 is to use R10 alone, or a voltage divider to create a bias or charge on C4. Here it should be an "over charge" to insure that the wave shape of FIG. 4C does not appear, and only the wave shapes of either FIG. 4B or FIG. 4D appear at the video in-out line as the video signal varies with different camera content.

Figure 4C:
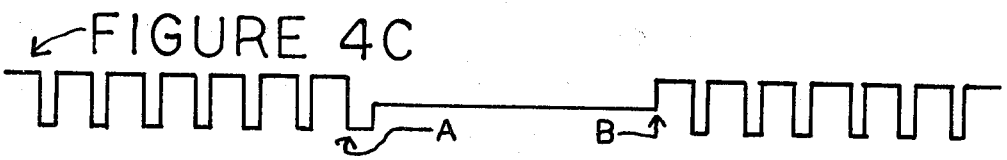
FIG. 4C shows a waveform of an "under reinserted" vertical sync pulse.
Figure 4D:
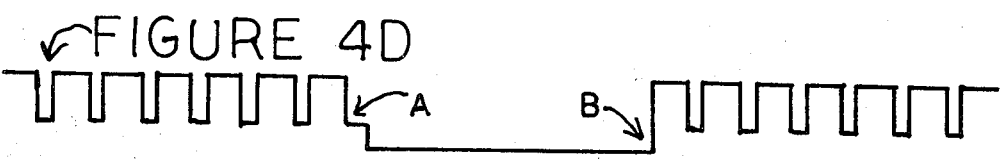
FIG. 4D shows a waveform of an "over reinserted" vertical sync pulse.

A wave shape of FIG. 4C causes instability of vertical sync, more than horizontal sync. This is due to the fact that the horizontal circuitry in the receivers is controlled by an A.F.C. circuit that "averages" many horizontal pulses and some can be "spared". No such averaging is used in vertical circuits. Signal waveshapes such as FIG. 4D may also upset the A.G.C. action (which is usually a peak detecting circuit) and cause either top to bottom shading or reduced contrast. While tolerable, these effects are not desired, but mention is made of them with an eye towards manufacture of a product at extremely low cost, "cutting corners" so to speak.

Also to be noted is the absence of the "serrations" in the reinserted vertical sync. If serrated vertical sync is required, than additional circuitry must be provided to accomplish the following: with reference to FIG. 3,
1. Timing means must be provided so Q5 can be turned "off" for serration time, OR;
2. means such as shown as "output" Q and "output" C and R in FIG. 3A should be provided together with Q5 and C4 of FIG. 3, for a second level of "clamping" to be also available, and timing means should be provided to activate either Q. & C. of FIG. 3A, or Q5 & c4 of FIG. 3, but not both at the same time.

Figure 3A:
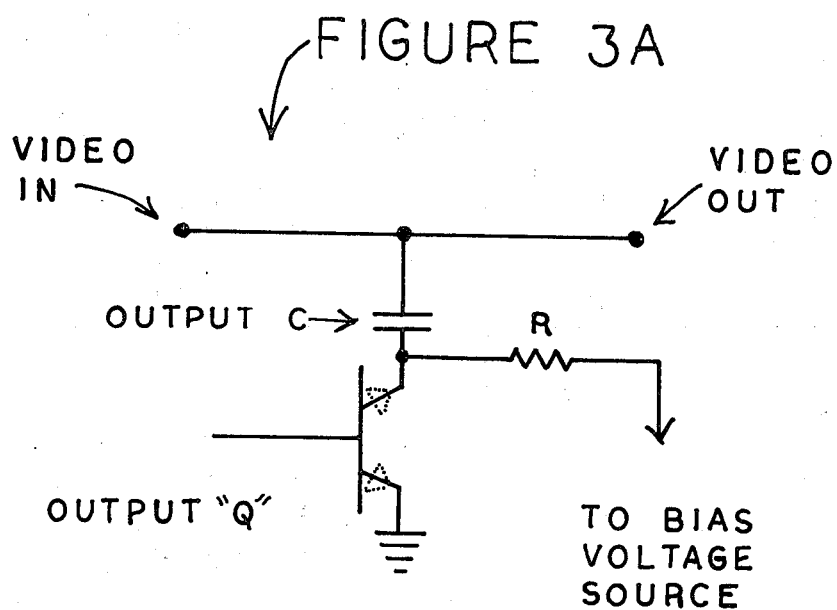
FIG. 3A shows an addition for adding serrations to the reinserted vertical sync.

With a thorough understanding of the operation of FIG. 3 and FIG. 3A and the given requirements above, it should be a straight forward matter to design the electronic controls for adding serrations to the reinserted vertical sync pulse and no further discussion of them seems required here.

Now with a full understanding of the operation of FIG. 3, and the bias charge on C4, it can be understood now that if R10 is returned to ground, instead of +VDC, that there will now be NO bias charge on C4, and when Q5 becomes active, during vertical sync time, then the video in-out line will be "crushed" to Zero volts, (A.C. & D.C.) which will then "clamp" the video in-out line also to ZERO volts. With normal peak to peak video signals, of 1 volt, and no D.C. bias (D.C. Zero and 1 volt peak to peak video), Zero volts represents grey level, and not "blacker than black" video, or "sync". Thus the same circuit will now WEAKEN vertical sync instead of restoring vertical sync.

This change in operation has been accomplished only by a simple change in bias on a single capacitor.

This will also emphasize how important the automatic control of this bias is to the operation of FIG. 3.

Also to note here, with respect to FIG. 3, is that it is also possible to simply eliminate C4, R10, R9, and C5 from FIG. 3, and generate weakened vertical sync pulses by connecting the output lead of Q5 directly to the video in-out line.

Figure 4E:
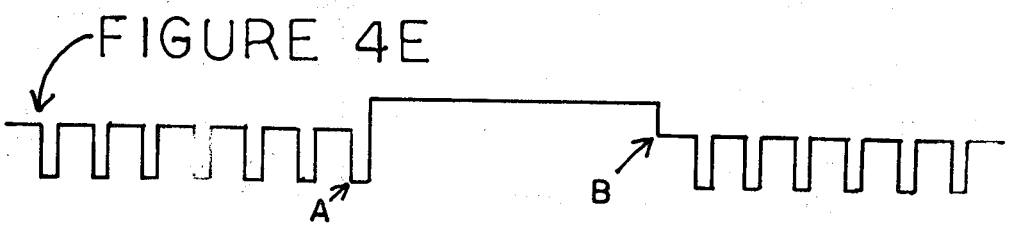
FIG. 4E shows a waveform of a weakened vertical sync pulse inserted in place of "normal" vertical sync.

Further to note, it is also possible now to return the lead of Q5 to a voltage source other than to ground as is shown in FIG. 3 to generate these weakened pulses at other than "Grey" level, even "white" or "whiter than white" if desired, (see FIG. 4E), or to use C4 with the Q5 lead grounded and add a "negative" Bias to C4.

Note also that to weaken the vertical sync (devices for use by tape producers) Q5 itself can also be eliminated along with C4, C5, R9 and R10, and then R8 could drive the video in-out line directly, since a "pull up" signal is available at the emitter of Q4 during vertical sync time.

Finally, a simple way is disclosed to vary the "percentage of weakening" of normal vertical sync pulses, using the basic input circuitry of FIG. 3 as a basis for the device. Simply make R2 a user adjustable control.

Now the amount of "normal" vertical sync left on the video in-out line can be varied from "full", all the way down to 5 micro seconds, (no vertical sync at all).

This can be a continuously variable control, or a "click type" wafer switch adding resistors, with the "click stops" labeled such as mild, medium, strong, extra strong etc., for the user to be able to return repeatedly to the exact setting time after time, whenever the device is used.

In accordance with another embodiment of the present invention the circuit design of FIG. 3 allows for very inexpensive video "response tailoring" circuitry to be added to the video in-out line using only passive circuit elements such as resistors and capacitors and inductors to modify the high frequency response of the vertical sync corrected video output.

Pre-recorded video tapes are sometimes lacking somewhat in high frequency response for sharp detail, or contain excessive signal to noise ratio. (this noise is most often in the high frequency spectrum of the video signal). Since a product is being manufactured with video input and video output provision already, a few pennies worth of parts may be added in series or parallel with the video output line to custom tailor the high frequency response characteristics of the video output signal without substantially increasing the finished product manufacturing cost. (a lot of extra function for very little extra cost).

Figure 6:
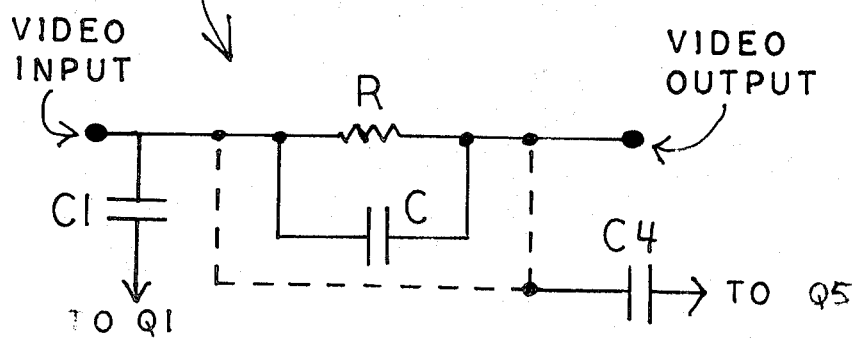
FIG. 6 shows a partial addition to FIG. 3 to disclose a simple way to alter the high frequency response characteristic of the composite video output.

With reference to FIG. 6, a single resistor R and a single capacitor C are added to the video line of FIG. 3 as shown, to boost up the high frequencies, (increased sharpness and detail).

Figure 6A:
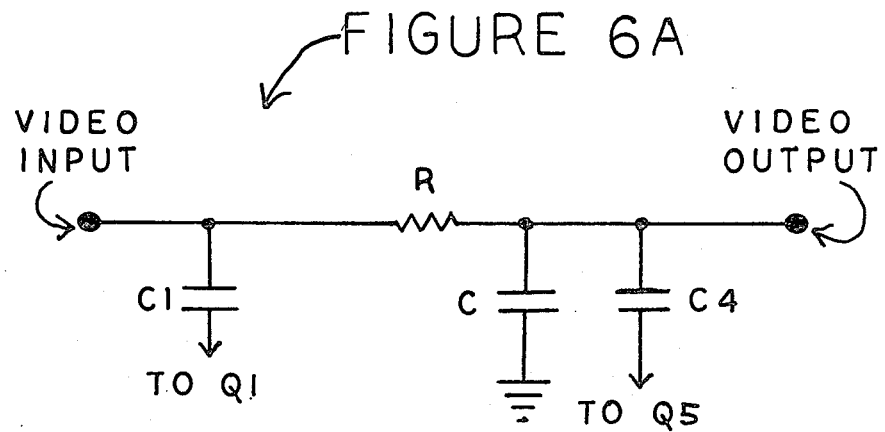
FIG. 6A shows another addition of FIG. 3.

With reference to FIG. 6A, a single resistor R and a single capacitor C are added to the video line of FIG. 3 as shown to cut down the high frequencies, causing reduced noise level in the video output, and a "softening" of the picture.

Figure 6B:
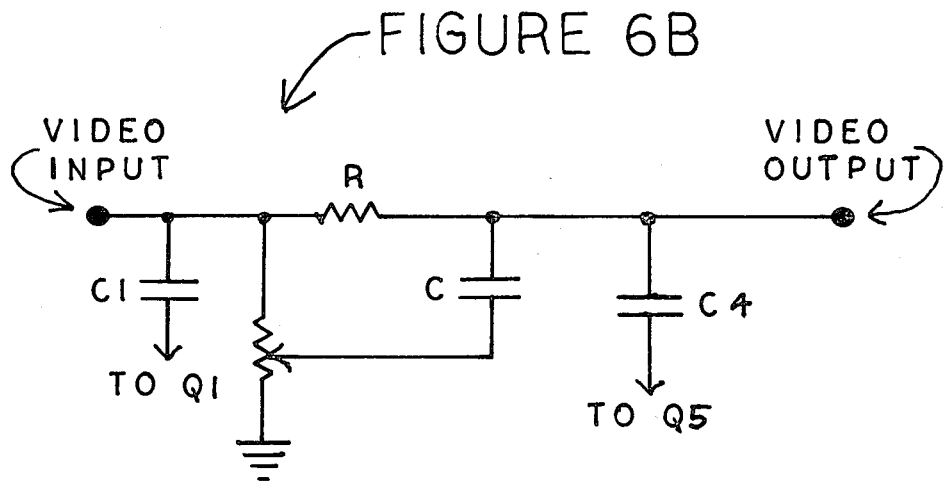
FIG. 6B shows another addition to FIG. 3.

With reference to FIG. 6B, a single resistor R and a single capacitor C are added to the video line of FIG. 3 as shown, and a user adjustable control is added so the user can adjust the video signal for a more pleasing picture if desired to suit their individual taste; (this control can either boost the high frequency response of the video out signal, or cut down the high frequency response of the video out signal.

This is a similar control found on many home consumer television sets, and is often labeled "sharpness", although here, a true "boosting" of the high frequencies can be realized (as compared to straight wire coupling). For the applications of FIG. 6, FIG. 6A, and FIG. 6B, the added resistor R can be on the order of 10 to 220 ohms.

Figure 9:
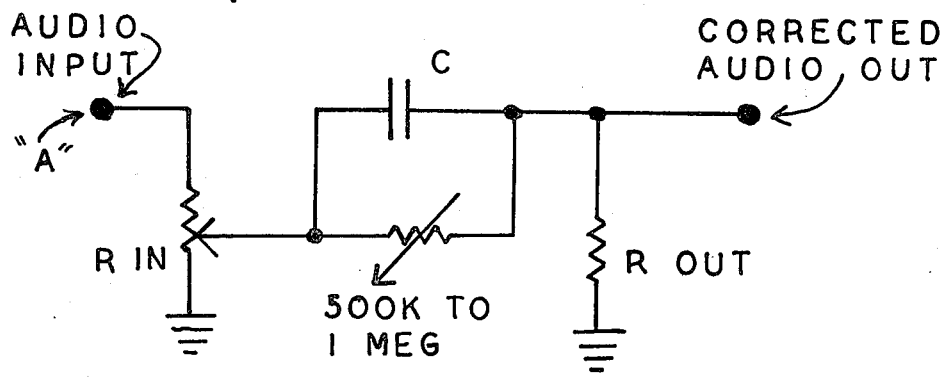
FIG. 9 shows a simple audio correction circuit.

In accordance with another embodiment of the present invention, FIG. 9 shows a simple circuit to add total audio amplitude correction and equalization together with the overall stabilization of the video very simply and economically. This gives full and total system control to both audio and video when the circuit of FIG. 9 is used in conjunction with the base band video-in and base band video-out circuits described previously.

With reference to FIG. 9 uncorrected audio in arrives at point A and is coupled through R in, (which can reduce the amplitude of the audio signal to any degree needed) to the parallel combination of capacitor C and variable resistor RC. Depending on the setting of RC, any amount of equalization may be simply "tuned in" by simply varying RC from Zero ohms (no correction) to its maximum correction (full ohmage setting). At this full ohmage setting the high frequency boosting is determined by the value of C and the output terminating resistor R out.

R out is typically on the order of 10,000 to 100,000 ohms for the audio "line" out connections on home video recorders. For these audio "line" circuits a value of about 500 pico farads for C and 10K for R out will give a considerable degree of high frequency boosting (low frequency elimination).

Figure 9A:
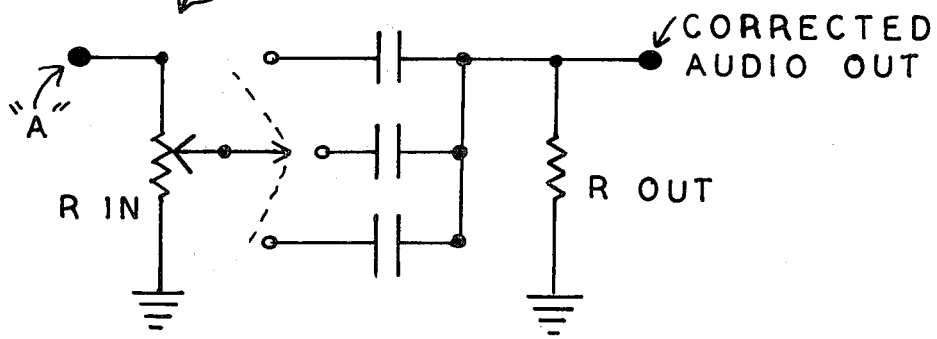
FIG. 9A shows another simple audio correction circuit.

Also possible, is a scheme such as shown in FIG. 9A, where a switch selected capacitor (one at a time of differing values) can be selected by S1, or 1,2,3, or more capacitors are placed in parallel successiveley by switch S1.

Figure 9B:
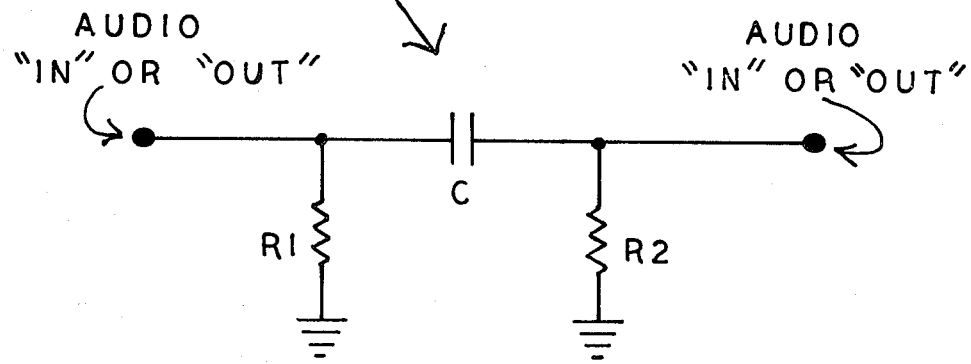
FIG. 9B shows another simple audio correction circuit.

In still yet another embodiment of the present invention, FIG. 9B shows an ADJUSTABLE audio frequency correcting circuit was HAS NO ADJUSTMENTS.

By choosing R1 and R2 to different values, (FIG. 9B), two different audio characteristic outputs can be realized by simply REVERSING the input and output connecting cables carrying the audio signals to and from the invention.

Figure 6C:
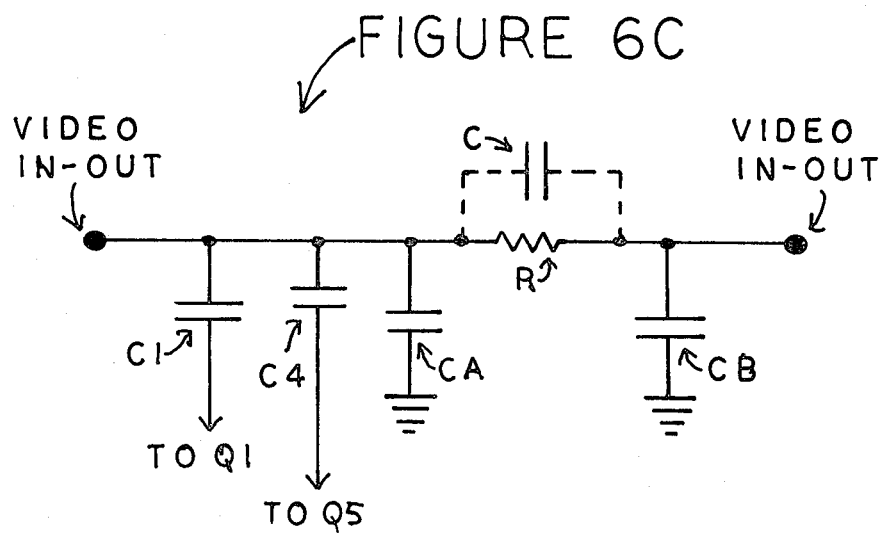
FIG. 6C shows another addition to FIG. 3.

Also note, that because of the nature of the vertical sync reinserting invention, that the same "adjustable WITHOUT adjustments" high frequecy processing technique can be used for the video lines as well, as FIG. 3 clearly indicates a "common" input-output video line. FIG. 6C shows one such typical modification to FIG. 3, where Ca and CB have different values.

The principles described above are well known art for audio frequency response processing, but the inclusion of the simple circuitries of FIG. 9, or FIG. 9A or FIG. 9B in particular, along with the basic circuit of FIG. 3, combined with FIG. 6, or 6A, or 6B, will create a product whereby total control of correction of vertical sync and audio and video response tailoring can be combined in a single product of significant value to the consumer market, and all at an extremely low manufacturing cost.

Figure 7:
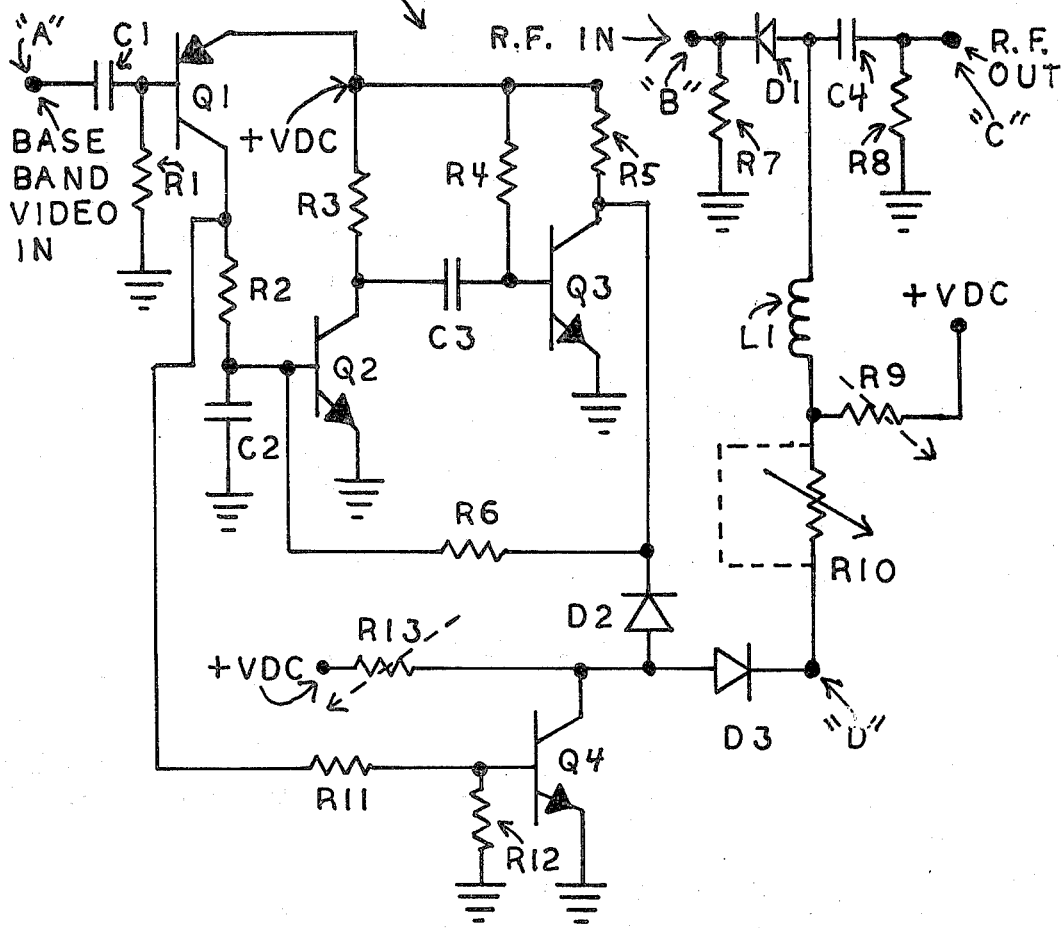
FIG. 7 shows another embodiment of the present invention where the reinserter acts on modulated radio frequency carrier waves.

In accordance with another embodiment of the present invention, FIG. 7 shows a system for reinserting vertical sync into radio frequency carrier lines instead of the video lines.

With reference to FIG. 4 showing a normal video signal at the vertical sync time and FIG. 4A, showing the same portion of a video signal having weakened vertical sync, it is apparent that the amplitude of the modulated R.F. carrier during sync time determines the height of the sync tip after demodulation at the television receiver.

If a method could be decised to sample the demodulated sync signal, determine what deficiency existed in its amplitude and correct the R.F. carrier in step with the degree of the deficiency, then the vertical sync could be reinserted into the R.F. carrier directly, and to the degree needed to bring the weakened vertical sync back to full strength.

FIG. 7 shows such a system which can be used with a single home video tape recorder. Here the "demodulated" signal is actual sampled BEFORE modulation by the video tape recorder, by accessing the video output jack on the tape recorder.

With reference to FIG. 7; point A, all the resistors R1 through R6, and C1, C2 and C3, as well as Q1, Q2 and Q3, function exactly as described for the same numbered components of FIG. 3. This produces an output pulse at the collector of Q3 whose timing and duration is equal to the vertical sync time. The amplitude of the pulse is determined by the value of the VDC and the resistors R5 and R6, and its generation is explained as for FIG. 3.

Now however the circuitry differs from FIG. 3, because the "output" circuity is designed to act on an R.F. signal ALREADY GENERATED BY THE VIDEO RECORDER.

Home video recorders already contain very carefully designed (and expensive) R.F. modulators to convert the base band composite video signals, and the audio signals to the radio frequency spectrum.

If a way could be divised to utilize the base band video signal (available at the recorders video output jack) to correct the output of the R.F. modulator of the tape recorder itself (all external to the tape recorder). Then an incredible savings in manufacturing cost could be realized.

FIG. 7 shows such a way. The R.F. signal output from the video tape machine is not coupled straight into the television receiver. Instead it is coupled to the reinserter device, and from there it is connected to the television receiver. While inside the device, this signal, which ALREADY contains both modulated audio and video, is "vertical sync corrected".

This method totally eliminates the need to manufacture an R.F. audio and video modulator and of course also eliminates its manufacturing cost, as well as the need for government approval for the R.F. modulator, since it no longer exists at all.

FIG. 7 shows how this is accomplished. The pulse at the collector of Q3 is now used as an "enable" pulse as described below.

Modulated R.F. from the video machine enters the device at point B. R7 (typically 50 to 200 ohms) provides both termination and a sure D.C. return path to ground in the preferred embodiment (simplest form).

Means is shown (here a diode) D1 to couple the R.F. signal to point C, which is the output to the television receiver. R8 (typically 50 to 500 ohms) is used for termination and C4 is used for D.C., isolation from the output line. Inductor L1 is shown (though not required) to keep stray R.F. from passing into the circuitry of the invention, and to keep any possible source of interference pickup from the invention, from the television receiver. (just good design practice).

Since the signal levels at point B and point C are on the order of microvolts or millivolts at most, then the diode means is used primarily as a variable resistor to couple the R.F. from point B to point C. The more D.C. current that is fed to D1, the lower its resistance becomes. The lower its resistance becomes, the more R.F. signal is passed from point B to point C. Since the varying amplitude of the output point C is in fact the video signal, then reinserting a weakened vertical sync pulse could be accomplished by lowering the resistance of D1 during vertical sync time only, thus increasing the peak to peak R.F. amplitude of the vertical sync and thus reinserting the vertical sync to full strength.

This is the purpose of R9 and R10. R9 sets a "steady state" resistance for D1, and R10 will decrease the resistance of D1 further when it also connects to a positive voltage source.

R10 then, will be connected to a positive voltage source only during those times when vertical sync is to be strengthened at point C. This is accomplished as follows: With reference to FIG. 7, the output collector of Q1 is positive only during "sync tip time" (both horizontal and vertical) and thus represents "full strength sync" whenever the collector of Q1 is "high". This signal is just opposite of what is needed for R10 drive, so Q1 collector is connected to an inverter stage (R11, R12, Q4 and R13). The collector of Q4 is now positive whenever NOT full strength sync is present at point B.

Since this means that the collector of Q4 is also positive during regular "camera" time as well as "weakened vertical sync" time, the signal at the collector of Q3 is "gated" or combined with the collector of Q4 output by Diode D2, coupling the collector of Q3 and Q4 so that the collector of Q4 can rise ONLY during BOTH vertical sync time AND "not full strength sync time" together. Diode D3 is used to couple the collector of Q4 to R10, and the junction of D3 and R10, point D, is now called "NOT full strength VERTICAL sync" time and is exactly the drive needed by R10 to correct the R.F. signal at point C.

D3 is added to allow an extra 0.6 volts of offset before R13 can act on D1. D3 could be jumpered out if D2 was germainium and D1 were silicon, as there would be ample offset voltage then.

You can now see that no matter what type of weakened vertical sync is used, such as for instance one half time full strength vertical sync and one half time weakened vertical sync time, OR one quarter time full strength vertical sync and 3 quarter time weakened vertical sync, OR ANY amount of weakened vertical sync time, the invention will automatically adjust the drive to R10 to compensate and correct point C for full strength vertical sync for full time.

R9 or R13 or R10 is made user adjustable to adjust for the AMPLITUDE of the correction signal to allow for the different fromats used by the tape producers (some vary the DEPTH of the weakness) from producer to producer.

Here a user adjustable control causes no problem because its a machine to television receiver system and if the user does not like what they are seeing, they adjust R9 or R13 or R10 until they see what they like on the screen of the television. R10 is used for current limit if R13 adjusts.

This differs from the video machine to video machine system, where full automatic circuitry is more important, because it would then be possible to adjust for what looks O.K. on the television receiver, but the electronics of the second machine may not be accepting the signal. Further in a machine to machine system, the user often "sets up" the equipment and leaves it unattended, so if the control is set marginally, or the video changes slightly, or the adjustment needed changes slightly after set up, the copying may not come out properly and this may go undiscovered until it is too late to correct it.

Even so, it is still possible to arrange the single video machine to television receiver electronics to be fully automatic if so desired, even though this would make the choice of resistors more critical. This could be accomplished by modifying FIG. 7 as shown in FIG. 8.

Figure 8:
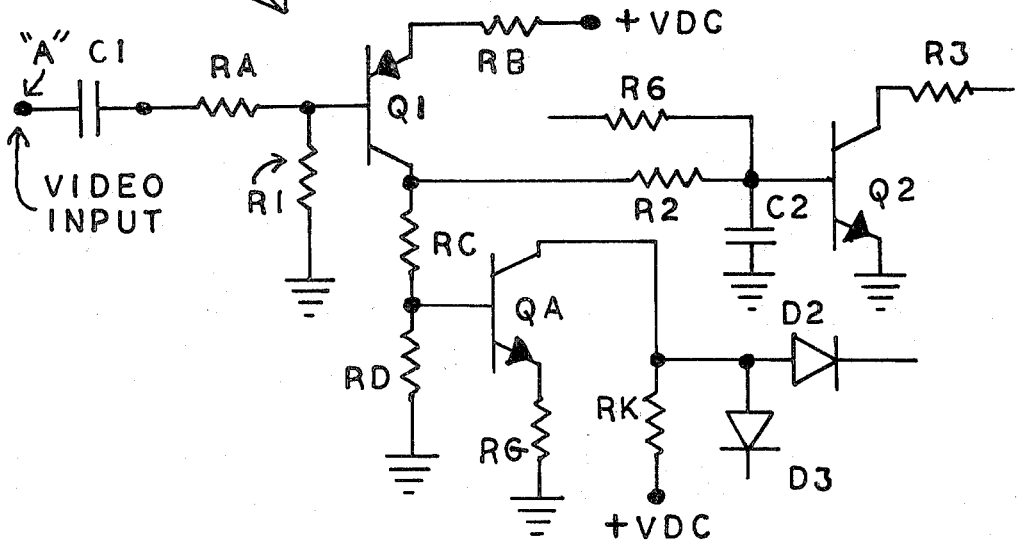
FIG. 8 shows a modification to FIG. 7 to make the circuitry automatic.

With reference to FIG. 8 composite video input signal enters at point A, and is coupled via C1 to the base of a PNP transistor through RA, and resistor RB is added to the emitter circuit of Q1 to bring Q1 out of Class C operation, and allow Q1 to become more linear than the normal sync separator. The output of Q1 (its collector) now contains the very signal needed to correct the R.F. carrier being modulated up to R.F. by the tape player, COMPOSITE SYNC. The composite sync signal at the collector of Q1 now contains information about BOTH the duration AND the amplitude of the deficiency of the weakened vertical sync. This is precisely the signal needed to correct the modulated R.F. carrier back to full strength vertical sync.

The collector load resistor for Q1 is composed of a voltage divider RC and RD to limit the amplitude of the composite sync signal. Resistors RG and RK and QA comprise of an inverter stage, and the collector of QA contains a signal of composite sync including information about both duration AND amplitude of the correction needed for the particular format in use by the tape producer.

QA of FIG. 8 will substitute for Q4 of FIG. 7 and the rest of the circuit will operate as explained for FIG. 7 including the "gating" or combining action of D2 as previously explained. Resistors RC & RD will substitute for resistors R11 and R12, and their value will be changed such that R11 and R12 will operate Q4 as a switch only, while RC and RD will operate QA in a more linear mode. Finally, R10 will be chosen in value according to the VDC used and R9 will be chosen to make the overall circuit operate in a linear fashion over the full range of formats chosen by the various producers.

The arrangement used for either variation of the circuit now allows the entire reinserter circuitry to be manufactured for less than the cost of just a well designed audio-video modulator alone, so now the entire device may be sold for less than the cost of one component of a prior art approach, which required video processing circuitry as well as the audio-video modulator.

Obviously other means may be substituted for the single diode D1 shown in FIG. 7 but a single diode is very inexpensive. Also the position in the circuit of D1 and C4 may be reversed, and the circuit will still function as described above.

An important point to note about FIG. 6 (also note the alternate connections of C4), FIGS. 6A, 6B, 6C, (note also the possible extra capacitor), FIG. 9, FIG. 9A, FIG. 9B is this: ALL these "extra" passive parts are to be added INSIDE the invention so as to avoid a "second" product which has to be manufactured, packaged, shipped and sold separately. The circuit design of the present invention allow such simple additions without upsetting its operation.

It is recognized that modifications and variations to the enclosed embodiments of the present invention may readily occur to those skilled in the art and, consequently it is intended that the claims be interpreted to cover such modifications and equivalents.

What is claimed is:

1. A vertical sync signal strengthening circuit for strengthening the vertical sync signal in a base band composite video signal containing a weak vertical sync signal comprising:
    extracting means connected to the conductor carrying said video signal from its source to its destination, for extracting vertical sync signal information from said video signal;
    means to process said vertical sync signal information to provide a correcting signal to strengthen said weak vertical sync signal; and
    means to couple said correcting signal back to the conductor carrying said video signal, to strengthen said weak vertical sync signal.

2. The circuit described in claim 1 wherein:
said extracting means includes a capacitor.

3. The circuit described in claim 1 wherein:

said means to couple said correcting signal back to the conductor carrying said video signal includes a capacitor containing a predetermined charge bias.

4. A vertical sync signal strengthening circuit for strengthening the vertical sync signal in a base band composite video signal containing a weak vertical sync signal, and also modifying the high frequency characteristics of this base band composite video signal comprising:
- extracting means connected to the conductor carrying said video signal from its source to its destination, for extracting vertical sync signal information from said video signal;
- means to process said vertical sync signal information to provide a correcting signal to strengthen said weak vertical sync signal;
- means to couple said correcting signal back to the conductor carrying said video signal, to strengthen said weak vertical sync signal; and
- means comprising passive electronic elements between said video signal source and said video signal destination, to alter the high frequency characteristics of said video signal arriving at said destination.

5. The circuit described in claim 4 wherein:
said extracting means includes a capacitor.

6. The circuit described in claim 4 wherein:
said means to couple said correcting signal back to the conductor carrying said video signal includes a capacitor containing a predetermined charge bias.

7. A vertical sync signal strengthening circuit for strengthening the vertical sync signal in a base band composite video signal containing a weak vertical sync signal, and also modifying the high frequency characteristics of this base band composite video signal, and also modifying the frequency characteristics of the audio signal accompanying this base band composite video signal comprising:
- extracting means connected to the conductor carrying said video signal from its source to its destination, for extracting vertical sync signal information from said video signal;
- means to process said vertical sync signal information to provide a correcting signal to strengthen said weak vertical sync signal;
- means to couple said correcting signal back to the conductor carrying said video signal, to strengthen said weak vertical sync signal;
- means comprising passive electronic elements between said video signal source and said video signal destination, to alter the high frequency characteristics of said video signal arriving at said destination; and
- means comprising passive electronic elements in series with the audio conductor carrying said audio signal, to alter the frequency characteristics of said audio signal.

8. The circuit described in claim 7 wherein:
said extracting means includes a capacitor.

9. The circuit described in claim 7 wherein:
said means to couple said correcting signal back to the conductor carrying said video signal includes a capacitor containing a predetermined charge bias.

10. A vertical sync signal weakening circuit for weakening the vertical sync signal in a base band composite video signal containing a strong vertical sync signal comprising:
- extracting means connected to the conductor carrying said video signal from its source to its destination, for extracting vertical sync signal information from said video signal;
- means to process said vertical sync signal information to provide a weakening signal to weaken said strong vertical sync signal; and
- means to couple said weakening signal back to the conductor carrying said video signal, to weaken said strong vertical sync signal.

11. The circuit described in claim 10 wherein:
said extracting means includes a capacitor.

12. The circuit described in claim 10 wherein:
said means to couple said weakening signal back to the conductor carrying said video signal includes a capacitor containing a predetermined charge bias.

13. The circuit described in claim 10 wherein:
said means to couple said weakening signal back to the conductor carrying said video signal is a transistor.

14. The circuit described in claim 10 wherein:
said means to couple said weakening signal back to the conductor carrying said video signal is a resistor.

15. A vertical sync signal strengthening circuit for strengthening the vertical sync signal in a modulated radio frequency carrier containing a weak vertical sync signal comprising:
- an input source of a base band signal containing at least vertical sync signal information about a base band composite video signal that was used to modulate a radio frequency carrier;
- an input source of a radio frequency carrier that was modulated by the said base band composite video signal;
- extracting means coupled to said input source of a base band signal for extracting vertical sync signal information from said input source of a base band signal;
- means to process said vertical sync signal information to provide a controlling signal;
- controllable means to couple said input source of a radio frequency carrier to an output; and
- means to couple said controling signal to said controllable means to cause said controllable means to strengthen said weak vertical sync signal at said output.

16. The circuit described in claim 15 wherein:
said controllable means is a diode.

17. The circuit described in claim 15 wherein:
said base band signal containing at least vertical sync signal information, and said radio frequency carrier are generated within a video tape machine.

18. The circuit described in claim 15 wherein:
said means to couple said controlling signal to said controllable means requires no external adjustment.

* * * * *